United States Patent
Chen et al.

(10) Patent No.: US 9,357,619 B2
(45) Date of Patent: May 31, 2016

(54) LAMP WITH PASSIVE INFRARED SENSOR

(71) Applicant: LivingStyle Enterprises Limited, Guang Dong Province (CN)

(72) Inventors: Ming-Yun Chen, Guang Dong Province (CN); Cai-Jin Li, Guang Dong Province (CN)

(73) Assignee: LIVINGSTYLE ENTERPRISES LIMITED, Guang Dong Province (CN)

( * ) Notice: Subject to any disclaimer, the term of this patent is extended or adjusted under 35 U.S.C. 154(b) by 103 days.

(21) Appl. No.: 14/249,701

(22) Filed: Apr. 10, 2014

(65) Prior Publication Data

US 2014/0292205 A1  Oct. 2, 2014

Related U.S. Application Data

(63) Continuation-in-part of application No. 12/973,942, filed on Dec. 21, 2010, now Pat. No. 8,735,826.

(51) Int. Cl.
| | |
|---|---|
| *H05B 37/02* | (2006.01) |
| *G01J 5/02* | (2006.01) |
| *G01J 5/10* | (2006.01) |
| *G08B 13/19* | (2006.01) |
| *G01J 5/00* | (2006.01) |

(52) U.S. Cl.
CPC ........... *H05B 37/0227* (2013.01); *G01J 5/0025* (2013.01); *G01J 5/026* (2013.01); *G01J 5/10* (2013.01); *G08B 13/19* (2013.01)

(58) Field of Classification Search
CPC ...... H05B 37/0227; G01J 5/0025; G01J 5/10; G08B 13/19
See application file for complete search history.

(56) References Cited

U.S. PATENT DOCUMENTS

| 5,598,066 | A | * | 1/1997 | Wiesemann | ....... H05B 37/0227 250/238 |
|---|---|---|---|---|---|
| 5,946,209 | A | * | 8/1999 | Eckel | ................. H01H 47/007 315/159 |
| 2007/0285053 | A1 | | 12/2007 | Noguchi et al. | |
| 2011/0037757 | A1 | | 2/2011 | Song et al. | |
| 2012/0094240 | A1 | | 4/2012 | Rubinshtein | |

* cited by examiner

*Primary Examiner* — David Porta
*Assistant Examiner* — Mindy Vu
(74) *Attorney, Agent, or Firm* — WPAT, PC; Justin King

(57) ABSTRACT

A sheet processing device includes a supporting plate, a stapler, a casing, a protrusion structure, and a swinging arm. The casing is disposed over the supporting plate. A sheet conveying channel is formed between the supporting plate and the casing. The protrusion structure is disposed on a lower surface of the casing, located beside the stapler and accommodated within the sheet conveying channel. During the process of introducing a sheet into the supporting plate, the stapled side of the sheet is flattened by the protrusion structure, and thus the possibility of upturning the sheet is minimized. During the process of introducing the plural sheets to the stapler, the stapled sides of the plural sheets are flattened by the protrusion structure, and thus the formation of the folded corners of the sheets is avoided.

5 Claims, 2 Drawing Sheets

LAMP WITH PASSIVE INFRARED SENSOR

CROSS-REFERENCE TO RELATED APPLICATIONS

This application is a continuous-in-part application claiming priority benefit from U.S. application Ser. No. 12/973,942, filed on 21 Dec. 2010, and entitled "Human infrared recipient processor".

FIELD OF THE INVENTION

The present invention relates to a lighting device having a passive infrared (PIR) sensor, and more particularly to a lighting device having a PIR sensor, which can accurately execute sensing operations free from the effect of environmental temperature drift.

BACKGROUND OF THE INVENTION

With the improvement on science and technology, a detection-type lighting device has been common in people's lives. In general, most of detection-type lighting devices are equipped with passive infrared (PIR) sensors, which detect whether there is any heat source, e.g. human body, entering a monitored zone. The sensing principle of a PIR is to detect the environmental temperature variation in the monitored zone, and generate a voltage value when variation occurs. Then it is determined whether the voltage value lies within a voltage range supposed to be generated in response to the motion of the heat source. If positive, the detection-type lighting device conducts light emission.

It is known the environmental temperature would significantly affect the sensing result of a PIR sensor. However, the environmental temperature around a detection-type lighting device inevitably varies with time. For example, the temperature in the daytime is typically higher than that in the nighttime; and the temperature in summer in northern hemisphere is generally higher than that in spring. Due to the temperature drift phenomena of the environmental temperature as exemplified above, the sensing result of the PIR sensor might fail to appropriate reflect the condition that a heat source is entering the monitored zone.

In an example, a threshold value for generating voltage sensing signals when the PIR sensor detects a human body is set to be 1.2V when the detection-type lighting device leaves factory. Therefore, the voltage sensing signals reaching 1.2V will result in light emission of the detection-type lighting device. On the other hand, any voltage sensing signal lower than 1.2V will be considered as noise, so no light emission will be conducted by the detection-type lighting device. However, the threshold value 1.2V set when leaving factory is a common voltage value set at a specified temperature, for example in winter. When the environmental temperature rises with season change to, for example, summer, the voltage value might rise up to 1.3V due to the higher environmental temperature. Accordingly, the voltage sensing signals generated when the PIR detects a human body, if detected to be 1.2V at this environmental temperature, will be determined as noise, so light emission should not be conducted by the detection-type lighting device. Since the threshold value is constant, erroneous action probably occurs for light emission, and the effect of intelligent illumination cannot be well performed.

For ameliorating the drawbacks, U.S. Pat. No. 6,288,395 discloses a sensor system includes combined PIR and temperature transducer, which uses the temperature transducer to detect environmental temperature. According to the sensing result of the temperature transducer, sensitivity of the PIR is tuned correspondingly so as to actually reflect the condition that a heat source is entering the monitored zone. However, according to U.S. Pat. No. 6,288,395, a temperature transducer is additional required, so the burden in cost and complexity in assembling are raised due to the additional temperature transducer.

In view of the foregoing, a detection-type lighting device, which is capable of actually reflecting the condition that a heat source is entering the monitored zone without the additional temperature transducer, is an object to be solved in this technical field.

SUMMARY OF THE INVENTION

For solving the above-mentioned problems, the present invention provides a lighting device having a PIR sensor, which is set with an adaptive basic voltage threshold value so as to accurately execute sensing operations free from the effect of environmental temperature drift.

In accordance with the above descriptions, the present invention provides a lighting device having a passive infrared sensor, which includes: a light-emitting module; a passive infrared sensor generating a series of voltage sensing signals in a specified time period in response to a motion of a human body at an environmental temperature; and a control circuit module electrically connected to the light-emitting module and the passive infrared sensor, and presetting therein with an adaptive base voltage threshold value, wherein the control circuit module receives the voltage sensing signals from the passive infrared sensor for controlling light emission of the light-emitting module, wherein the control circuit module adjusts the adaptive base voltage threshold value if the occurrences that the voltage sensing signals do not comply with the adaptive base voltage threshold value have reached a preset adjusting reference.

Preferably, the preset adjusting reference is a preset total count of the occurrences that the voltage sensing signals do not comply with the adaptive base voltage threshold value.

Preferably, the control circuit module includes a microprocessor for adjusting the adaptive base voltage threshold value, wherein the microprocessor raises the adaptive base voltage threshold value when a count of the occurrences that the voltage sensing signals are higher than the adaptive base voltage threshold value due to the increase of the environmental temperature has reached a first preset count, or the microprocessor lowers the adaptive base voltage threshold value when a count of the occurrences that the voltage sensing signals are lower than the adaptive base voltage threshold value due to the decrease of the environmental temperature has reached a second preset count.

Preferably, the lighting device having a passive infrared sensor further comprises a driver circuit disposed between a power supply and the light-emitting module, wherein the driver circuit is coupled to the control circuit module.

Preferably, the lighting device having a passive infrared sensor further comprises a photosensitive resistor coupled to the control circuit module, wherein when the photosensitive resistor detects that the environmental brightness is lower than a default value, the control circuit module has the driver circuit drive the light-emitting module.

The present invention further provides a dynamic voltage-tuning method of a lighting device having a passive infrared sensor, comprising steps of:

a) providing a light-emitting module, a passive infrared sensor and a control circuit module, wherein the control circuit module is electrically connected to the light-emitting module and the passive infrared sensor, and the control circuit module is preset therein with an adaptive base voltage threshold value;

b) detecting any human body, and generating a series of corresponding voltage sensing signals by the passive infrared sensor in a specified time period; and c) transmitting the voltage sensing signals to the control circuit module, which is provided for the control circuit module to determine whether the voltage sensing signals comply with the adaptive base voltage threshold value; if positive, executing a step (c1) in which the adaptive base voltage threshold value remains unchanged and the light-emitting module is driven to emit light, and then returning to the step (b); and if negative, executing next step (d); and d) determining whether a count of the occurrences that the voltage sensing signals are higher or lower than the adaptive base voltage threshold value in a preset time period has reached a preset adjusting reference; if negative, executing a step (d1) in which the adaptive base voltage threshold value remains unchanged, and then returning to the step (b); and if positive executing a step (d2) in which the adaptive base voltage threshold value is adjusted to obtain a newly set adaptive base voltage threshold value, and then returning to the step (b).

Preferably, the preset adjusting reference is a preset total count of the occurrences that the voltage sensing signals do not comply with the adaptive base voltage threshold value.

Preferably, in the step (d2), if a count of the occurrences that the voltage sensing signals are higher than the adaptive base voltage threshold value in the preset time period has reached a preset count value, the control circuit module raises the adaptive base voltage threshold value so as to obtain a higher adaptive base voltage threshold value; and if a count of the occurrences that the voltage sensing signals are lower than the adaptive base voltage threshold value in the preset time period has reached the preset count value, the control circuit module lowers the adaptive base voltage threshold value so as to obtain a lower adaptive base voltage threshold value.

For further understanding the techniques, means and functions adopted by the present invention in order to achieve the desired objects, please refer to the detailed descriptions and accompanying drawings presented as follows. The objects, features and characteristics of the present invention can be understood more deeply and concretely. However, it is to be noted that the accompanying drawings are only provided for reference and illustration, instead of limiting the scope of the present invention.

DETAILED DESCRIPTION OF THE PREFERRED EMBODIMENT

Figure 1:
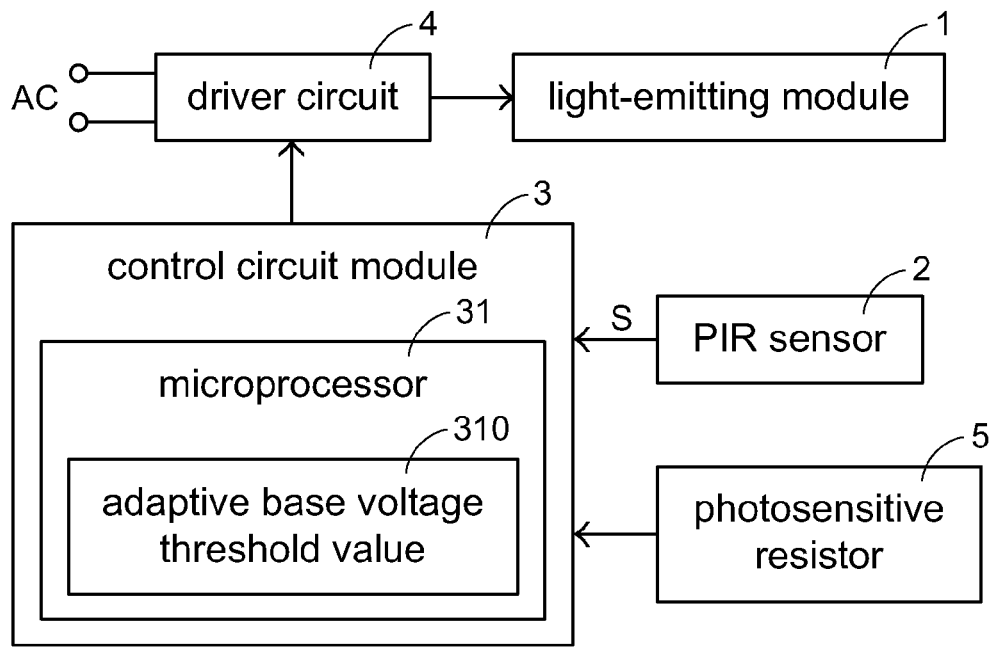
FIG. 1 is a schematic block diagram showing a lighting device having a passive infrared sensor according to the present invention.

Please refer to FIG. 1. FIG. 1 is a schematic block diagram showing a lighting device having a passive infrared (PIR) sensor according to the present invention. The lighting device having a passive infrared sensor according to the present invention includes a light-emitting module 1, a PIR sensor 2 and a control circuit module 3. The control circuit module 3 is electrically connected to the light-emitting module 1 and PIR sensor 2. The PIR sensor 2 is used for detecting whether there is any human body entering a monitored zone. If there is a human body entering the monitored zone, the PIR sensor 2 will generate a voltage in response. As for how the control circuit module 3 realizes the voltage generated by the PIR sensor 2 and controls the light-emitting module 1 accordingly, descriptions will be given hereinafter.

The PIR sensor 2 is briefly described first. The sensing principle is that when there is variation in environmental temperature in a zone monitored by the PIR sensor 2, the PIR sensor 2 will generate charges $\Delta Q$ on two electrodes due to the pyroelectricity effect, and a weak voltage will be generated between two electrodes. In a practical example, when a body, e.g. a human body, enters the zone monitored by the PIR sensor 2, the human body temperature differing from the original environmental temperature disturbs the environmental temperature, and thus the PIR sensor 2 generates a voltage sensing signal S.

After the sensing operation has been performed by the PIR sensor 2 for a certain period of time, the PIR sensor 2 consecutively generates voltage sensing signals S in response to the disturbance of the environmental temperature. The voltage sensing signals S are then transmitted to the control circuit module 3, and the control circuit module 3 then determines whether the environmental temperature disturbance is caused by motion of the human body or any other occasional event, e.g. noise generated by another heat source.

Furthermore, the control circuit module 3 is set with an adaptive base voltage threshold value 310. The control circuit module 3 includes a microprocessor 31. The adaptive base voltage threshold value 310 can be adjusted by the microprocessor 31. The control circuit module 3 compares the received voltage sensing signals S with the adaptive base voltage threshold value 310 to determine whether the environmental temperature disturbance is caused by motion of the human body or any other occasional event. In other words, if there is motion of a human body detected, the lighting device having the passive infrared sensor according to the present invention will drive the light-emitting module 1 to emit light. If it is an occasional event, the lighting device having the passive infrared sensor according to the present invention will not drive the light-emitting module 1 to emit light. This is the logic the control circuit module 3 follows to execute discrimination and operation.

Furthermore, due to the feature of the PIR sensor 2, each the voltage sensing signal S generated when the PIR normally executes a sensing operation at a specified environmental temperature has a corresponding voltage value. In order to assure of high sensing accuracy of the lighting device having the passive infrared sensor according to the present invention at a variety of environmental temperatures, the control circuit module 3 according to the present invention is set with an adaptive base voltage threshold value 310, which is dynamically variable with the environmental temperature change.

Figure 2:
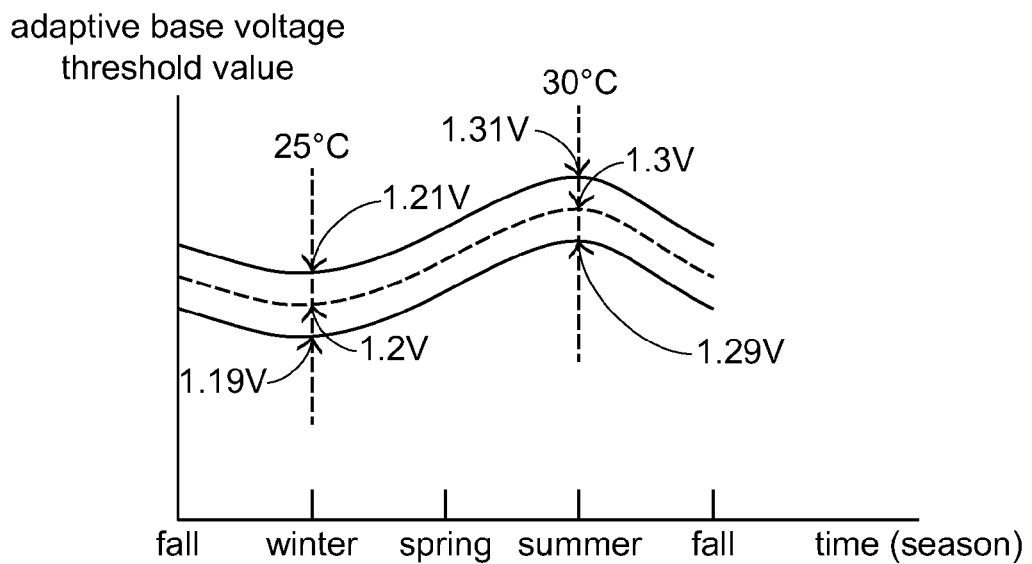
FIG. 2 is a plot showing the correlation of an adaptive base voltage threshold value of a lighting device having a passive infrared sensor according to the present invention to time.

FIG. 2 is a plot showing the correlation of an adaptive base voltage threshold value of a lighting device having a passive infrared sensor according to the present invention to time. Please refer to FIG. 1 and FIG. 2 in combination. For example, assume the PIR sensor 2 is disposed at an environmental temperature of 25 degrees C. and the voltage sensing signal S generated in response to the detected motion of a human body by the PIR sensor 2 commonly lies in a range of 1.2V±10 mV, wherein 1.2V is a preset base voltage threshold value at 25 degrees C. and ±10 mV is an allowable error range of the preset base voltage threshold value. Therefore, if the adaptive base voltage threshold value is set to be 1.2V, the sensing accuracy at the environmental temperature of 25 degrees C. is satisfactory as the erroneous action caused by the voltage sensing signal S lower than 1.2V can be avoided.

Alternatively, assume the PIR sensor 2 is disposed at an environmental temperature of 30 degrees C. and the voltage sensing signal S generated in response to the detected motion of a human body by the PIR sensor 2 commonly lies in a range of 1.3V±10 mV, wherein 1.3V is a preset base voltage threshold value at 30 degrees C. and ±10 mV is an allowable error range of the preset base voltage threshold value. Therefore, if the adaptive base voltage threshold value is set to be 1.3V, the sensing accuracy at the environmental temperature of 30 degrees C. is satisfactory as the erroneous action caused by the voltage sensing signal S lower than 1.3V can be avoided. In other words, at the above-mentioned two environmental temperatures, if the voltage sensing signals S generated by the PIR sensor 2 are lower than respective adaptive base voltage threshold values 310 at respective environmental temperatures, the voltage sensing signals S will be determined as noise, and it is not necessary to drive light-emitting module 1 to emit light.

It is to be noted that the above voltage value set as the adaptive base voltage threshold value is given for example only. In a real product, the manufacturer may set proper voltage values, varying with different mechanical and electrical devices or assemblies. Therefore, the adaptive base voltage threshold value should not be limited to a specific voltage value.

A lighting device having a passive infrared sensor according to the present invention must be subjected to changing environmental temperatures due to the experience in days and nights and different seasons. Assume the average temperature is 30 degrees C. in summer, and 25 degrees C. in winter. Refer to FIG. 2, which shows the change of the adaptive base voltage threshold value with the seasons change in a year. Since the adaptive base voltage threshold value 310 set in the control circuit module 3 can be adaptively tuned in response to the environmental temperature change, the PIR sensor 2 is capable of accurately determining whether the environmental temperature disturbance is caused by motion of the human body or simply an occasional event no matter what season or temperature the PIR sensor 2 executes the sensing operation in.

Subsequently, the mechanism that the microprocessor 31 tunes the adaptive base voltage threshold value will be described. For making the PIR sensor 2 accurately execute the sensing operation in a variety of temperatures, it is necessary to discriminate if the environmental temperature changes so that the adaptive base voltage threshold value 310 can be adjusted accordingly. In detail, the present invention determines whether the environmental temperature changes by determining whether the occurrences that the voltage sensing signals S do not comply with the adaptive base voltage threshold value 310, e.g. exceeding a preset count and/or extending beyond a preset voltage range, have reached a preset adjusting reference. For example, the preset adjusting reference is a preset total count of the occurrences that the voltage sensing signals S do not comply with the adaptive base voltage threshold value 310. When the situation that the voltage sensing signals S do not comply with the adaptive base voltage threshold value occurs many times, it means the environmental temperature has changed instead of just an occasional event. Therefore, the adaptive base voltage threshold value 310 should be correspondingly adjusted to maintain sensing accuracy.

In detail, the microprocessor 31 raises the adaptive base voltage threshold value 310 when a count of the occurrences that many of the voltage sensing signals S are higher than the adaptive base voltage threshold value 310 due to the increase of the environmental temperature has reached a first preset count. On the other hand, the microprocessor 31 lowers the adaptive base voltage threshold value 310 when a count of the occurrences that the voltage sensing signals S are lower than the adaptive base voltage threshold value 310 due to the decrease of the environmental temperature has reached a second preset count. In this manner, the lighting device having a passive infrared sensor according to the present invention is capable of adjusting the adaptive base voltage threshold value 310 to a newly set value in response to the environmental temperature change. Although the voltage sensing signals S generated by the PIR sensor 2 may still have increasing or decreasing voltages with the increasing or decreasing environmental temperature, the adaptive base voltage threshold value 310 is also increased or decreased correspondingly, so the sensing accuracy of the PIR sensor 2 can be exempted from the effect of environmental temperature change.

The lighting device having a passive infrared sensor according to the present invention further includes a driver circuit 4. The driver circuit 4 is disposed between an AC power supply and the light-emitting module 1, and the driver circuit 4 is coupled to the control circuit module 3 for receiving commands from the control circuit module 3 to drive the light-emitting module 1. Preferably, the light-emitting module 1 is an LED light-emitting module. Furthermore, the lighting device having a passive infrared sensor according to the present invention further includes a photosensitive resistor 5. The photosensitive resistor 5 is coupled to the control circuit module 3, wherein when the photosensitive resistor 5 is used for detecting the environmental brightness. The photosensitive resistor 5 detects whether the environmental brightness is lower than a default value during a suspension time period when the light-emitting module 1 suspends light emission. If it is determined that the environmental brightness is higher than a default value, it means the environmental brightness is strong enough, so the light-emitting module 1 will not emit light. If it is determined that the environmental brightness is lower than a default value, it means insufficient environmental brightness, so the control circuit module 3 controls the light emission of the light-emitting module 1 by detecting whether there are voltage sensing signals S complying with the adaptive base voltage threshold value 310 generated.

Figure 3:
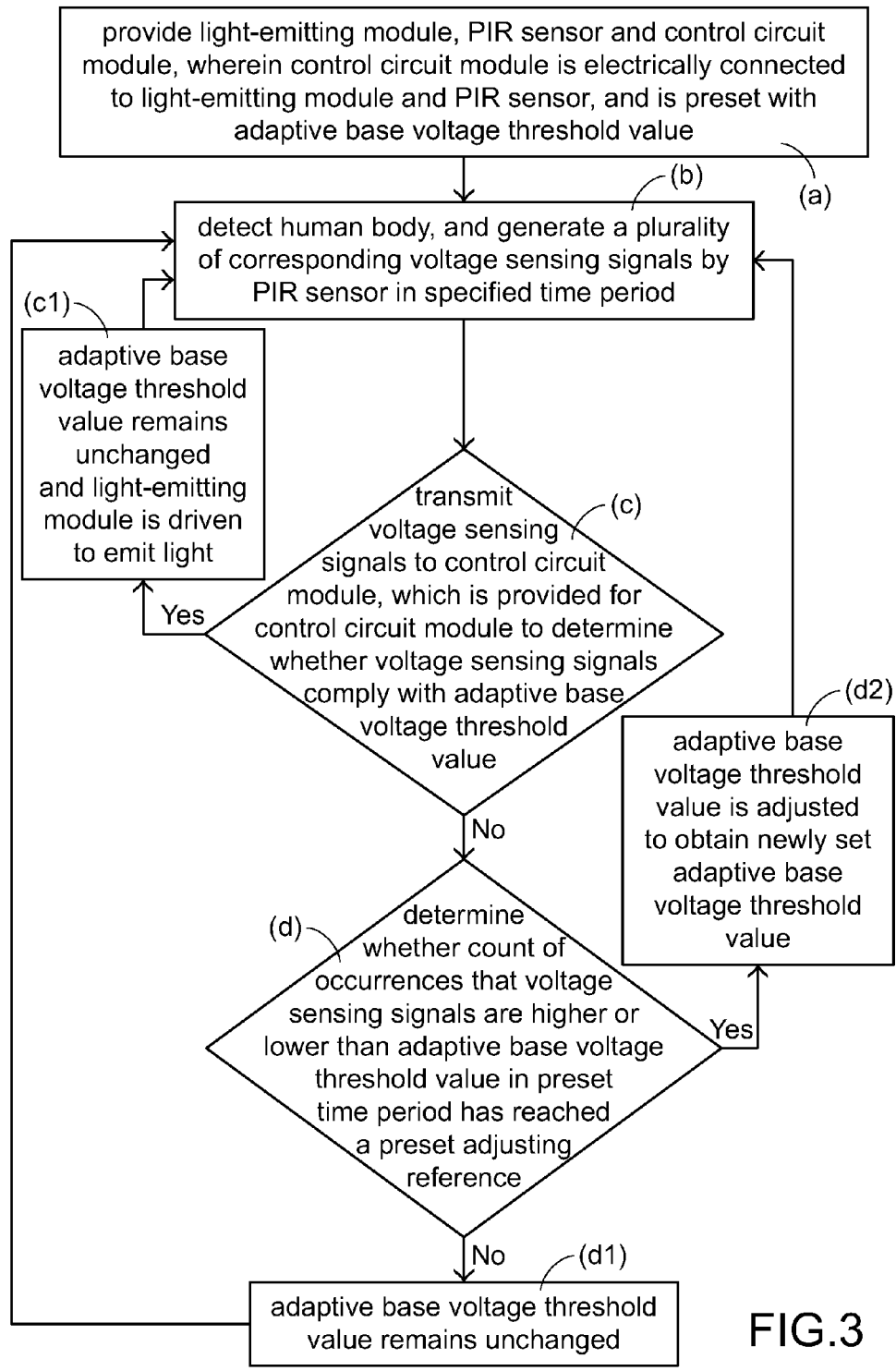
FIG. 3 is a flowchart illustrating a dynamic voltage-tuning method of a lighting device having a passive infrared sensor according to the present invention.

Please refer to FIG. 3. FIG. 3 illustrates a dynamic voltage-tuning method of a lighting device having a passive infrared sensor according to the present invention. A step (a) is first executed to provide a light-emitting module 1, a passive infrared (PIR) sensor 2 and a control circuit module 3, wherein the control circuit module 3 is electrically connected to the light-emitting module 1 and the passive infrared sensor 2, and the control circuit module 3 is preset therein with an adaptive base voltage threshold value 310. In the step (a), the adaptive base voltage threshold value 310 indicates a tolerant voltage range adjustable with the environmental temperature change. Moreover, the adaptive base voltage threshold value 310 has a floating voltage range for tolerating a certain error of the voltage sensing signals S.

After the step (a), a step (b) is executed. In the step (b), motion of any possible human body in a range monitored by the PIR sensor 2 is detected, and a series of voltage sensing signals S are generated in response to a variety of motions of human body.

Then a step (c) is executed. In the step (c), the voltage sensing signals S are transmitted to the control circuit module 3, which is provided for the control circuit module 3 to determine whether the voltage sensing signals S comply with the adaptive base voltage threshold value 310. If the voltage sensing signals S received by the control circuit module 3 comply with the adaptive base voltage threshold value 310, the adaptive base voltage threshold value 310 remains unchanged, and meanwhile, a command is transmitted to the driver module 4 to drive the light-emitting module 1 to emit light. Then return to the detection state of the step (b). If the voltage sensing signals S received by the control circuit module 3 do not comply with the adaptive base voltage threshold value 310, a step (d) is executed.

In the step (d), it is determined whether a count of the occurrences that the voltage sensing signals do not comply with, e.g. are higher or lower than, the adaptive base voltage threshold value in a preset time period has reached a preset adjusting reference. In a preferred embodiment, the preset adjusting reference is a preset total count of the occurrences that the voltage sensing signals S do not comply with the adaptive base voltage threshold value 310. If many voltage sensing signals S do not comply with the adaptive base voltage threshold value 310 but the preset adjusting reference has not been reached, it means current adaptive base voltage threshold value 310 still match the current environmental temperature, so a step (d1) is executed, in which the adaptive base voltage threshold value 310 remains unchanged, and then return to the step (b). If many voltage sensing signals S do not comply with the adaptive base voltage threshold value 310 and the preset adjusting reference has been reached, it means current adaptive base voltage threshold value 310 has mismatched the current environmental temperature, so a step (d2) is executed, in which the control circuit module 3 adjusts the adaptive base voltage threshold value 310 accordingly to obtain a newly set adaptive base voltage threshold value, thereby improving the sensing operation at the current environmental temperature. Then return to the detection state of the step (b).

In more detail, in the step (d2), if a count of the occurrences that the voltage sensing signals S are higher than the adaptive base voltage threshold value 310 in the preset time period has reached a preset count value, the control circuit module 3 raises the adaptive base voltage threshold value 310 so as to obtain a higher adaptive base voltage threshold value 310; and if a count of the occurrences that the voltage sensing signals S are lower than the adaptive base voltage threshold value 310 in the preset time period has reached the preset count value, the control circuit module 3 lowers the adaptive base voltage threshold value 310 so as to obtain a lower adaptive base voltage threshold value 310. Afterwards, in subsequent sensing operations, although the voltage sensing signals S generated by the PIR sensor 2 may still have increasing or decreasing voltages with the increasing or decreasing environmental temperature, the adaptive base voltage threshold value 310 is also increased or decreased correspondingly, so the sensing accuracy of the PIR sensor 2 can be exempted from the effect of environmental temperature change.

To sum up, the lighting device having a passive infrared sensor according to the present invention correspondingly adjusts the adaptive base voltage threshold value of the control circuit module according to the environmental temperature so as to have the PIR free from the effect of environmental temperature drift while maintaining well and accurate sensing. With the well and accurate sensing, light-emitting device can be accurately driven and erroneous action can be avoided. Meanwhile, the present invention simply uses a PIR sensor to detect the environmental temperature change, and no additional temperature transducer is disposed. Therefore, cost can be saved and assembling can be less complicated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lighting device having a passive infrared sensor, comprising:
    a light-emitting module;
    a passive infrared sensor generating a series of voltage sensing signals within a specified time period in response to motions of a human body at an environmental temperature; and
    a control circuit module electrically connected to the light-emitting module and the passive infrared sensor, and presetting therein with an adaptive base voltage threshold value, wherein the control circuit module receives the voltage sensing signals from the passive infrared sensor for controlling light emission of the light-emitting module;
    wherein the control circuit module raises the adaptive base voltage threshold value when a count of the occurrences that the voltage sensing signals from the passive infrared sensor are higher than the adaptive base voltage threshold value has reached a first preset count, or the control circuit module lowers the adaptive base voltage threshold value when a count of the occurrences that the voltage sensing signals from the passive infrared sensor are lower than the adaptive base voltage threshold value has reached a second preset count.

2. The lighting device having a passive infrared sensor according to claim 1, further comprising a driver circuit disposed between a power supply and the light-emitting module, wherein the driver circuit is coupled to the control circuit module.

3. The lighting device having a passive infrared sensor according to claim 2, further comprising a photosensitive resistor coupled to the control circuit module, wherein when the photosensitive resistor detects that the environmental brightness is lower than a default value, the control circuit module controls the driver circuit to drive the light-emitting module when the voltage sensing signals comply with the adaptive base voltage threshold value.

4. The lighting device having a passive infrared sensor according to claim 2, wherein the adaptive base voltage threshold value is defined with a floating voltage range for tolerating a certain error of the voltage sensing signals.

5. A dynamic voltage-tuning method of a lighting device having a passive infrared sensor, comprising steps of:
    (a) providing a light-emitting module, a passive infrared sensor and a control circuit module, wherein the control circuit module is electrically connected to the light-emitting module and the passive infrared sensor, and the control circuit module is preset therein with an adaptive base voltage threshold value;

(b) detecting any human body, and generating a series of corresponding voltage sensing signals by the passive infrared sensor within a specified time period; and (c) transmitting the voltage sensing signals to the control circuit module, which is provided for the control circuit module to determine whether the voltage sensing signals comply with the adaptive base voltage threshold value; if positive, executing a step (c1) in which the adaptive base voltage threshold value remains unchanged and the light-emitting module is driven to emit light, and then returning to the step (b); and if negative, executing next step (d); and (d) determining whether a count of the occurrences that the voltage sensing signals are higher or lower than the adaptive base voltage threshold value has reached a preset adjusting reference; if negative, executing a step (d1) in which the adaptive base voltage threshold value remains unchanged, and then returning to the step (b); and if positive executing a step (d2) if a count of the occurrences that the voltage sensing signals are higher than the adaptive base voltage threshold value has reached a preset count value, the control circuit module raises the adaptive base voltage threshold value so as to obtain a higher adaptive base voltage threshold value; and if a count of the occurrences that the voltage sensing signals are lower than the adaptive base voltage threshold value has reached the preset count value, the control circuit module lowers the adaptive base voltage threshold value so as to obtain a lower adaptive base voltage threshold value, and then returning to the step (b).

* * * * *